(12) United States Patent
White et al.

(10) Patent No.: US 11,702,856 B2
(45) Date of Patent: Jul. 18, 2023

(54) MULTI-THREAT MITIGATION SECURITY APPARATUS FOR PROTECTING PERSONNEL, ASSETS AND CRITICAL INFRASTRUCTURE

(71) Applicant: ATFP Associates LLC, Ponte Vedra Beach, FL (US)

(72) Inventors: Kenneth M. White, Ponte Vedra Beach, FL (US); Allan R. Mangold, Fallbrook, CA (US)

(73) Assignee: ThreatStop LLC, Sheridan, WY (US)

( * ) Notice: Subject to any disclaimer, the term of this patent is extended or adjusted under 35 U.S.C. 154(b) by 272 days.

(21) Appl. No.: 16/999,562

(22) Filed: Aug. 21, 2020

(65) Prior Publication Data

US 2021/0140189 A1    May 13, 2021

Related U.S. Application Data

(60) Provisional application No. 62/984,350, filed on Mar. 3, 2020, provisional application No. 62/892,910, filed on Aug. 28, 2019.

(51) Int. Cl.
*E04H 9/06* (2006.01)
*F41H 5/24* (2006.01)
(Continued)

(52) U.S. Cl.
CPC ............. *E04H 9/06* (2013.01); *B32B 5/02* (2013.01); *B32B 5/18* (2013.01); *B32B 5/245* (2013.01); *E04H 9/14* (2013.01); *E04H 9/16* (2013.01); *E04H 17/1602* (2021.01); *E06B 3/7015* (2013.01); *F41H 5/013* (2013.01);

*F41H 5/026* (2013.01); *F41H 5/0421* (2013.01); *F41H 5/24* (2013.01); *B32B 2260/021* (2013.01);
(Continued)

(58) Field of Classification Search
CPC . B32B 2260/046; B32B 2571/02; E04H 9/06; E04H 9/14; E04H 9/16; E04H 17/1602; E06B 3/7015; E06B 2003/7023; F41H 5/013; F41H 5/0421; F41H 5/24; F41H 5/0457
See application file for complete search history.

(56) References Cited

U.S. PATENT DOCUMENTS 3,423,891 A    1/1969  Burris
4,036,104 A *  7/1977  Pagano ............... F41H 5/023
                                                      89/36.02
(Continued)

FOREIGN PATENT DOCUMENTS

WO    2014172463 A1    10/2014
WO    2015157179 A1    10/2015
(Continued)

*Primary Examiner* — Jessie T Fonseca
(74) *Attorney, Agent, or Firm* — Breiner & Breiner, L.L.C.

(57) ABSTRACT

A multi-threat security apparatus system for critical infrastructure protection is disclosed having an above-ground concrete base, a vertical post system adapted to be attached to the above-ground concrete base and to receive a plurality of louvers. The plurality of louvers provides the necessary ballistic protection for and air flow through to the critical infrastructure. The louvers may include a composite of aluminum foam, a resin impregnated ballistic material and an aluminum foam. The composite structure may be used on doors, panels or building walls.

4 Claims, 4 Drawing Sheets

(51) Int. Cl.

| | |
|---|---|
| *E04H 17/16* | (2006.01) |
| *B32B 5/18* | (2006.01) |
| *B32B 5/02* | (2006.01) |
| *B32B 5/24* | (2006.01) |
| *F41H 5/013* | (2006.01) |
| *F41H 5/04* | (2006.01) |
| *E06B 3/70* | (2006.01) |
| *E04H 9/16* | (2006.01) |
| *E04H 9/14* | (2006.01) |
| *F41H 5/02* | (2006.01) |

(52) U.S. Cl.
 CPC ... *B32B 2260/046* (2013.01); *B32B 2262/101* (2013.01); *B32B 2266/045* (2013.01); *B32B 2571/02* (2013.01); *B32B 2607/00* (2013.01); *E06B 2003/7023* (2013.01)

(56) References Cited

U.S. PATENT DOCUMENTS

| | | | |
|---|---|---|---|
| 4,198,219 A * | 4/1980 | Krisko | B01D 45/08 55/440 |
| 4,325,283 A * | 4/1982 | Bemiss | B60K 11/00 89/36.02 |
| 4,467,562 A | 8/1984 | Hemmerling | |
| 4,498,660 A | 2/1985 | Brema et al. | |
| 4,723,588 A | 2/1988 | Ruppel | |
| 5,452,641 A * | 9/1995 | Kariya | E06B 7/082 109/78 |
| 5,641,933 A | 6/1997 | Kim | |
| 5,678,369 A | 10/1997 | Ishikawa et al. | |
| 5,880,394 A * | 3/1999 | Kim | F41H 7/035 89/914 |
| 6,086,122 A * | 7/2000 | Dieterich | F41H 5/013 293/115 |
| 6,877,285 B2 | 4/2005 | Poma et al. | |
| 8,875,461 B2 | 11/2014 | Kestermont | |
| 10,012,479 B2 | 7/2018 | Boviall et al. | |
| 10,053,887 B2 | 8/2018 | Chu et al. | |
| 10,224,699 B2 | 3/2019 | Leber | |
| 10,260,843 B2 | 4/2019 | Ferguson | |
| 2003/0080248 A1 | 5/2003 | Morgan | |
| 2009/0090236 A1 | 4/2009 | Misencik et al. | |
| 2010/0206158 A1 | 8/2010 | Neethling | |
| 2012/0240757 A1 * | 9/2012 | Schade | F41H 5/026 89/36.02 |
| 2015/0268005 A1 | 9/2015 | Keren et al. | |
| 2016/0209181 A1 | 7/2016 | Adrain | |
| 2017/0030689 A1 | 2/2017 | Ferguson | |
| 2018/0030755 A1 * | 2/2018 | Patterson | F41H 5/24 |
| 2018/0238659 A1 * | 8/2018 | Ferguson | F41H 5/013 |
| 2019/0032397 A1 * | 1/2019 | Sosa | E06B 3/08 |
| 2019/0078861 A1 * | 3/2019 | Norman | F41H 5/013 |
| 2019/0113312 A1 * | 4/2019 | Adrain | F41H 5/26 |
| 2019/0153741 A1 * | 5/2019 | Monk | E04B 1/942 |
| 2021/0131170 A1 * | 5/2021 | Glover | E06B 5/10 |
| 2022/0003037 A1 * | 1/2022 | Everett | E06B 5/11 |

FOREIGN PATENT DOCUMENTS

| | | | | |
|---|---|---|---|---|
| WO | WO-2015157179 A1 * | 10/2015 | | F41H 5/026 |
| WO | 2017056062 A1 | 4/2017 | | |
| WO | WO-2018051331 A1 * | 3/2018 | | F16K 31/34 |

* cited by examiner

MULTI-THREAT MITIGATION SECURITY APPARATUS FOR PROTECTING PERSONNEL, ASSETS AND CRITICAL INFRASTRUCTURE

RELATED APPLICATION

This application claims benefit of U.S. Provisional Application Ser. No. 62/984,350, filed Mar. 3, 2020, entitled "Multi-Threat Mitigation Security Apparatus For Protecting Personnel, Assets And Critical Infrastructure," and U.S. Provisional Application Ser. No. 62/892,910, filed Aug. 28, 2019, entitled "Ballistic Louver And Above Grade Foundation Security Apparatus System For Critical Infrastructure, Assets And Power Grid Substations," which applications are incorporated herein by reference in their entirety.

FIELD OF THE INVENTION

The present invention relates to a multi-threat mitigation security apparatus for protecting personnel, assets and critical infrastructure. More specifically, the invention is directed to a door or a panel having a composite material therein providing security from multiple threats and apparatus using the door, panel or multiple panels.

BACKGROUND OF THE INVENTION

There are multiple threats in the world requiring the need for a security apparatus to provide protection therefrom. For example, such threats may include, but are not limited to, those discussed below.

Ballistic Threat. Ballistic attacks on personnel, assets and critical infrastructure are now commonplace, and a light-weight ballistic mitigation product will provide protection against these threats. Active shooter events have occurred at primary schools (Sandy Hook Elementary School), secondary schools (Columbine High School), and universities (Virginia Tech), resulting in mass casualties. Military bases have witnessed casualties from active shooters as well (Fort Hood, Tex.; Washington Navy Yard, Washington, D.C.; and Naval Air Station Pensacola, Fla.). In providing ballistic protection for schools, military bases, and other locations, the security apparatus may include a door and/or panel and/or a unified wall panel system. The present invention is directed to a new and improved door and/or panel and/or unified wall panel system to address such threat as discussed herein.

Electric grid assets and critical infrastructure are also subject to ballistic threats, such as the assault in 2013 on Pacific Gas and Electric Company's Metcalf Transmission Substation in Coyote, Calif. That attack resulted in more than $15 million worth of equipment damage and exposed a vulnerability in the national electric grid. The Federal Energy Regulatory Commission subsequently ordered the imposition of mandatory physical security standards for substations, with hefty fines for companies not bringing their sites into compliance. Substations require airflow to help cool the equipment and, therefore, standard ballistic resistant walls are not an ideal solution for providing security to such substations. Traditional deep foundation footings for security of substations are not an ideal solution and are preferably to be avoided due to the presence of underground utility networks and grounding issues. In providing security for critical infrastructure, assets and power grid substations, the security apparatus includes a louver, a door, or a panel (collectively referred to herein as "louver barrier") to provide protection against ballistic threats. Existing louver barriers available in the industry may not provide protection against such ballistic hazards and/or are not affordable and/or are not light weight and/or are not available to be mass produced and/or are not easy to install with little to no specialized equipment required. The present invention is directed to a new and improved louver barrier to address such threat as discussed herein.

Blast Threat. Improvised explosive devices and accidental explosions are a threat to personnel, assets and critical infrastructure, and a light-weight blast mitigation product will provide protection against these threats. The Alfred P. Murrah Federal Building in Oklahoma City, Okla. was subjected to a vehicle borne improvised explosive device that led to progressive collapse of the building, killing 168 people, injuring more than 650 people, and damaging over 300 nearby buildings. The U.S. Air Force military complex at Khobar Towers in Saudi Arabia witnessed a vehicle borne improvised explosive device that killed 19 and wounded nearly 500 personnel. Vapor cloud explosions at petrochemical plants injure people and destroy nearby property. Combat vehicles are subjected to exploding ordinances resulting in injuries and casualties, and are in need of light weight up-armoring. Ammunition storage containers require light-weight blast resistance to protect against sympathetic explosions during transit. In providing blast protection for federal buildings, military bases, manufacturing plants, vehicles, ammunition storage facilities, and other locations, the security apparatus includes a panel and/or door and/or a unified wall panel system. The present invention is directed to a new and improved panel and/or door and/or unified wall panel system to address such threats as discussed herein.

Forced Entry Threat. Forced entry attacks on assets and critical infrastructure are commonplace, and a light weight forced entry mitigation product would provide protection against these threats. Federal and military building codes require forced entry protection for certain buildings and assets. In providing forced entry protection for federal buildings, military bases, and other critical infrastructure, the security apparatus includes a door and/or a unified wall panel system. The present invention is directed to a new and improved door and/or unified wall panel system to address such threat as discussed herein.

High Wind Threat. High wind events like hurricanes and tornadoes inflict significant destruction on assets, buildings and critical infrastructure, and a light-weight high wind mitigation product will provide protection against these threats. Hurricane codes have been implemented in high wind areas that require construction of buildings and assets to certain levels of protection against high wind threats. In providing high wind threat protection for federal buildings, military bases, and other critical infrastructure, the security apparatus includes a door and/or a unified wall panel system. The present invention is directed to a new and improved door and/or unified wall panel system to address such threat as discussed herein.

Seismic Threat. The damages to property and injuries to personnel and critical infrastructure caused by seismic events like earthquakes are commonplace, and a light-weight unified wall panel system to mitigate structural damage will provide protection against these threats. The 2019 earthquake at Naval Air Weapons Station (NAWS) China Lake, Calif. inflicted major damage to many buildings and structures on the base. The Murray Middle School at NAWS China Lake, Calif. utilized a modular wall system designed to meet the Unified Facility Criteria Anti-Terrorism/Force Protection standards and California Zone 4 seismic requirements, and withstood Ridgecrest earthquakes registering a 6.4 and 7.1 on the Richter Scale with no reportable damage. In providing seismic protection for federal buildings, military bases, and other critical infrastructure, the security apparatus includes a door and/or a unified wall panel system. The present invention is directed to a new and improved door and/or unified wall panel system to address such threat as discussed herein.

Accordingly, there is a need in the market for a multi-threat mitigation security apparatus to simultaneously protect personnel, assets and critical infrastructure from several man-made and natural hazards, including ballistic, blast, forced entry, high wind, and seismic events.

SUMMARY OF THE INVENTION

The invention relates to an improved light weight door and/or panel product useful in, among other things, protecting assets and critical infrastructure from multiple threats and attacks including but not limited to ballistic, blast, forced entry, high wind and seismic events.

The invention further relates to an improved light weight unified wall panel system useful in, among other things, protecting assets and critical infrastructure from multiple threats and attacks including but not limited to ballistic, blast, forced entry, high wind and seismic events.

The invention further relates to a security apparatus that permits air flow through a louver barrier while protecting the assets and critical infrastructure from multiple threats and attacks including but not limited to ballistic, blast, forced entry, high wind and seismic events.

As seen in the attached Figures and description, the present invention provides for (1) a lightweight; (2) door or panel; (3) capable of defeating multiple threats including ballistic, blast, forced entry, high wind, seismic, and fire; (4) in a single composite construction; (5) all in demand by the market. The new and improved apparatus is light weight, affordable, capable of being mass produced and easy to install with little or no specialized equipment required. The apparatus may comprise a standard door or panel such as a three foot by seven foot fourteen gauge hollow metal door having an opening in at least one end. The apparatus may include in the interior of the door or panel (1) an aluminum foam panel by itself such as Alufoam, (2) a resin impregnated ballistic material panel such as basalt or H-glass by itself, (3) a composite of an aluminum foam core such as Alufoam with a resin impregnated ballistic material such as basalt or H-glass on one or both sides, or (4) a composite of resin impregnated ballistic material core such as basalt or H-glass with aluminum foam such as Alufoam on one or both sides. The panel or composite is preferably premade and inserted into the metal door or panel and the door or panel is sealed. The door or panel may be used in a security apparatus. The door or panel is light weight and easy to handle when installing. Current products do not meet these requirements, and there is no known manufacturer that provides such a product.

As also seen in the attached Figures and description, the present invention provides for (1) a lightweight; (2) unified wall panel system; (3) capable of defeating multiple threats including ballistic, blast, forced entry, high wind, seismic, and fire; (4) in a single composite construction; (5) all in demand by the market. The new and improved apparatus is light weight, affordable, capable of being mass produced and easy to install with little or no specialized equipment required. The apparatus may comprise an exterior wall cladding, exterior wall insulation, exterior structural panel, standard wall studs, standard wall bottom studs, the unified wall panel system of the invention within the stud framework, interior structural panel, and interior drywall. The apparatus may include in the interior of the unified wall panel system (1) an aluminum foam panel by itself such as Alufoam, (2) a resin impregnated ballistic material panel such as basalt or H-glass by itself, (3) a composite of an aluminum foam core such as Alufoam with a resin impregnated ballistic material such as basalt or H-glass on one or both sides, or (4) a composite of resin impregnated ballistic material core such as basalt or H-glass with aluminum foam such as Alufoam on one or both sides. The panel or composite is preferably premade and erected into the wall. The unified wall panel system may be used in a security apparatus. The unified wall panel system is light weight and easy to handle when installing. Current products do not meet these requirements, and there is no known manufacturer that provides such a product.

As also seen in the attached Figures and description, the present invention provides for a louver barrier perimeter security system in one embodiment as (1) an above ground foundation; (2) that provides ballistic protection; and (3) forced entry protection to the critical infrastructure, asset or substation; (4) while simultaneously eliminating line of sight to the protected asset and allowing airflow through the barrier to the critical infrastructure, asset or substation; (5) with minimal wind loading; (6) all in demand by the market. Current products do not meet these requirements, and there is no known manufacturer that provides such a product.

These primary and other objects of the invention will be apparent from the following description of the preferred embodiments of the invention and from the accompanying drawings.

BRIEF DESCRIPTION OF THE DRAWINGS

The following detailed description of the specific non-limiting embodiments of the present invention can be best understood when read in conjunction with the following drawings, where like structures are indicated by like reference numbers.

Referring to the drawings.

DETAILED DESCRIPTION OF THE PREFERRED EMBODIMENTS

Figure 2:
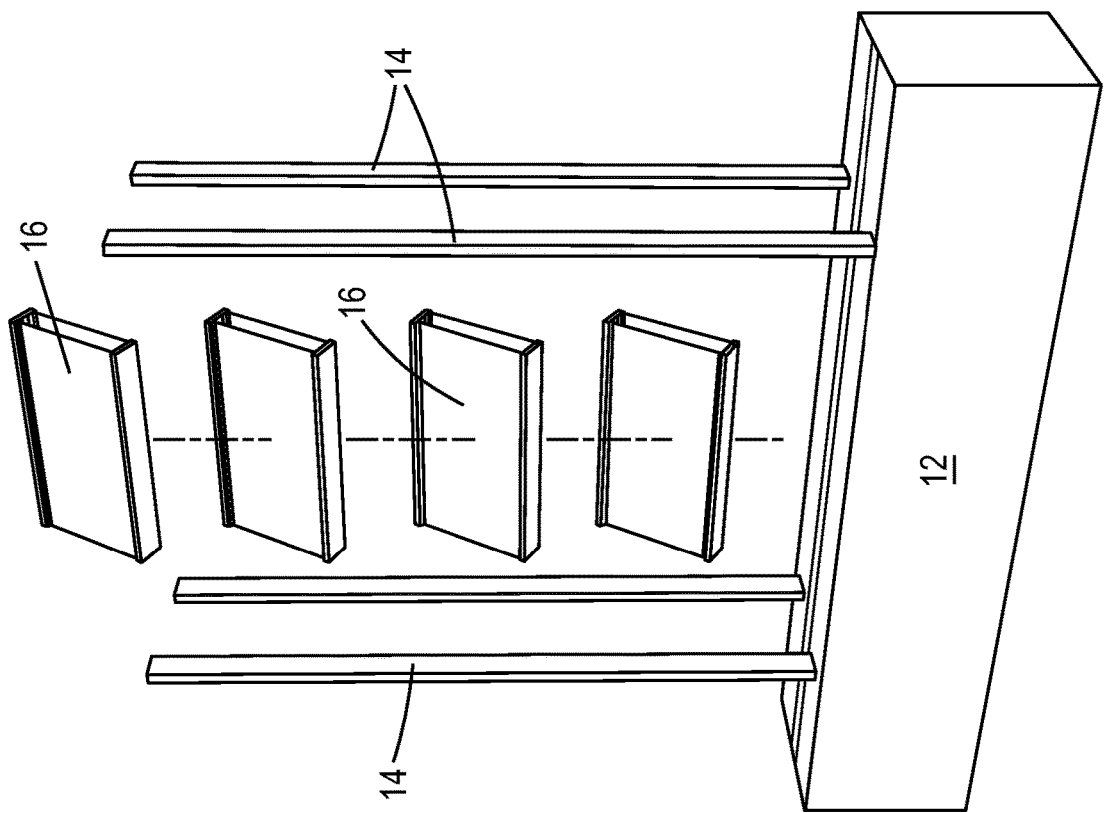
FIG. 2 is an exploded view of the security apparatus of FIG. 1.
Figure 1:
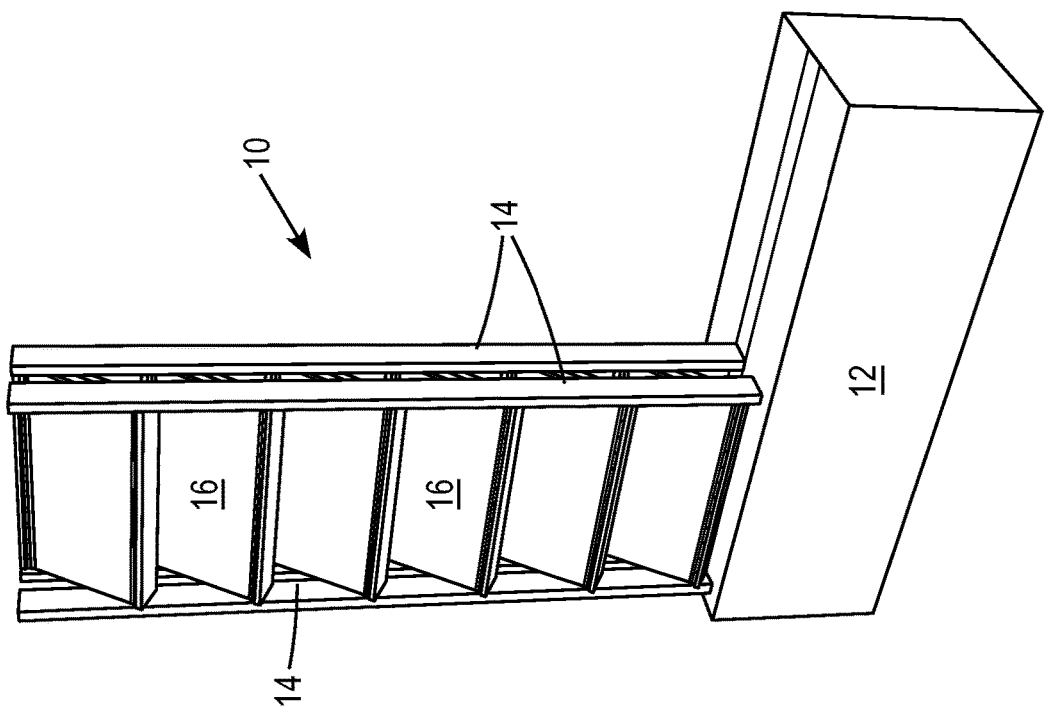
FIG. 1 is a perspective view of the louver barrier and above grade foundation security apparatus system invention for critical infrastructure, assets and power grid substations.
Figure 3:
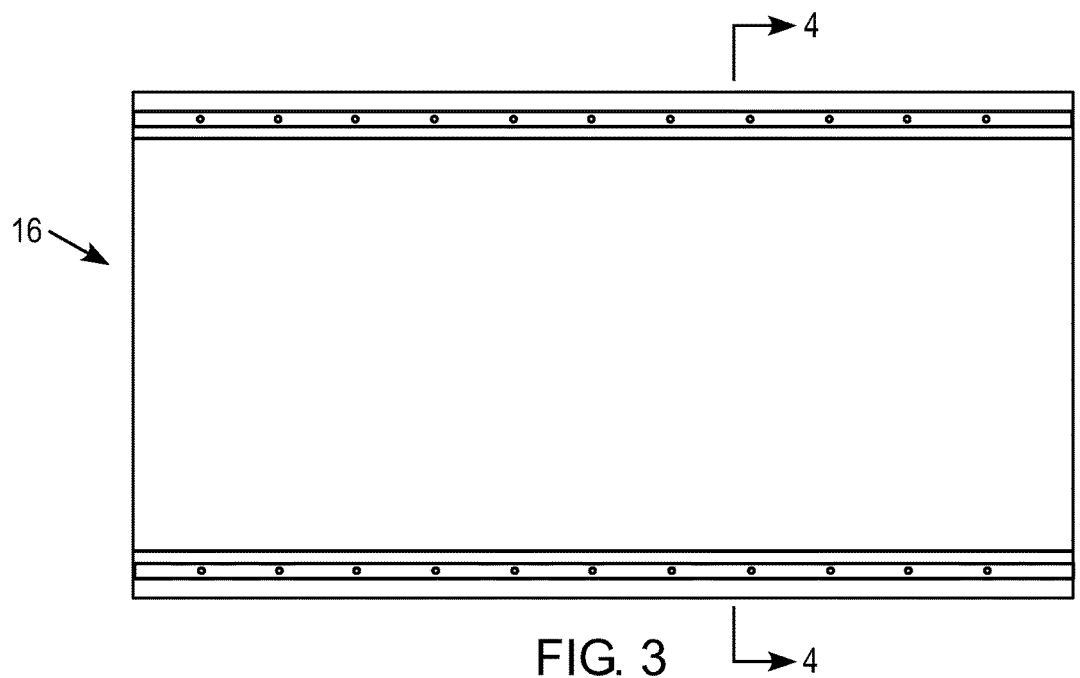
FIG. 3 is an individual louver barrier section as shown in FIGS. 1 and 2.
Figure 4:
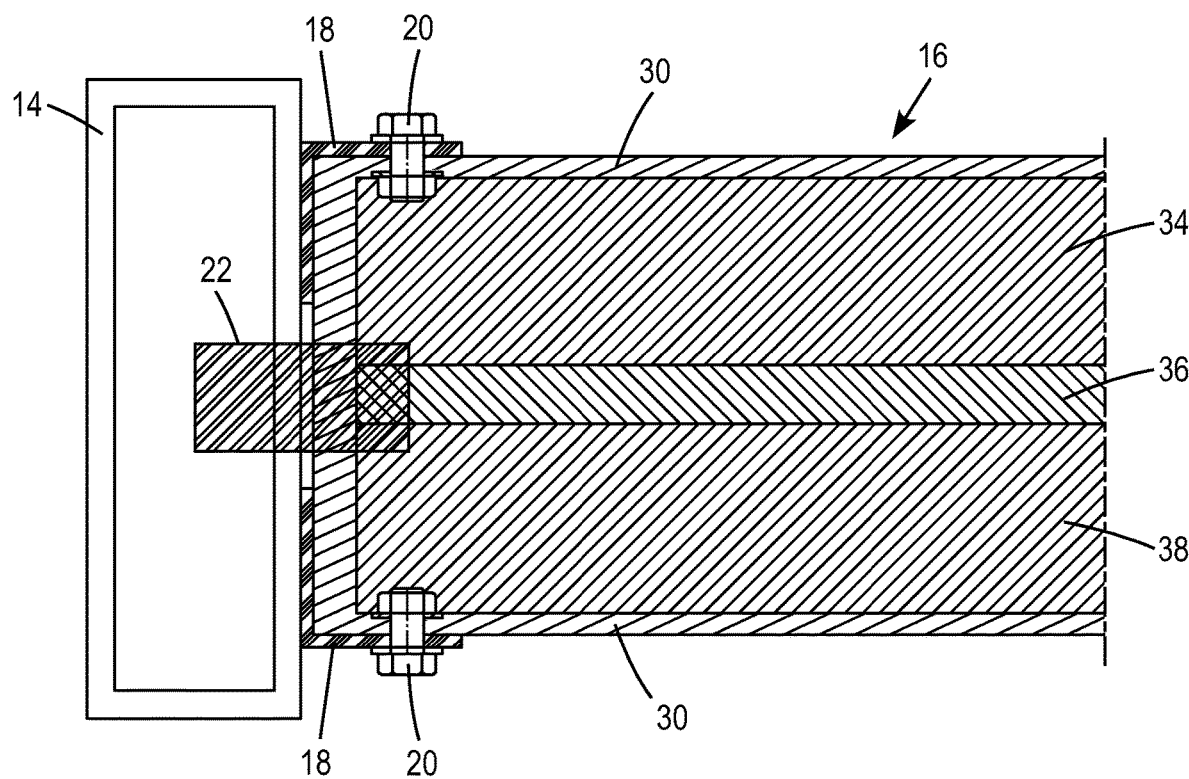
FIG. 4 is a partial cross-section of the louver barrier section of FIG. 3 taken along line 4-4 and connected to a support post as shown in FIGS. 1 and 2.
Figure 5:
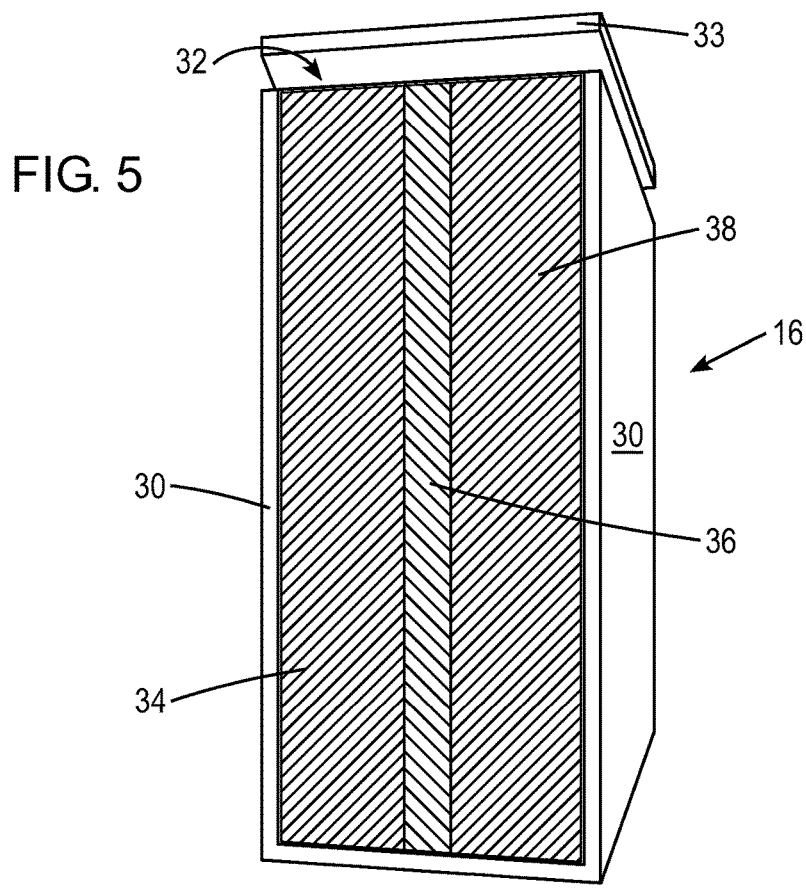
FIG. 5 shows a cross-section of the panel of the invention with one presently preferred composite material.
Figure 6:
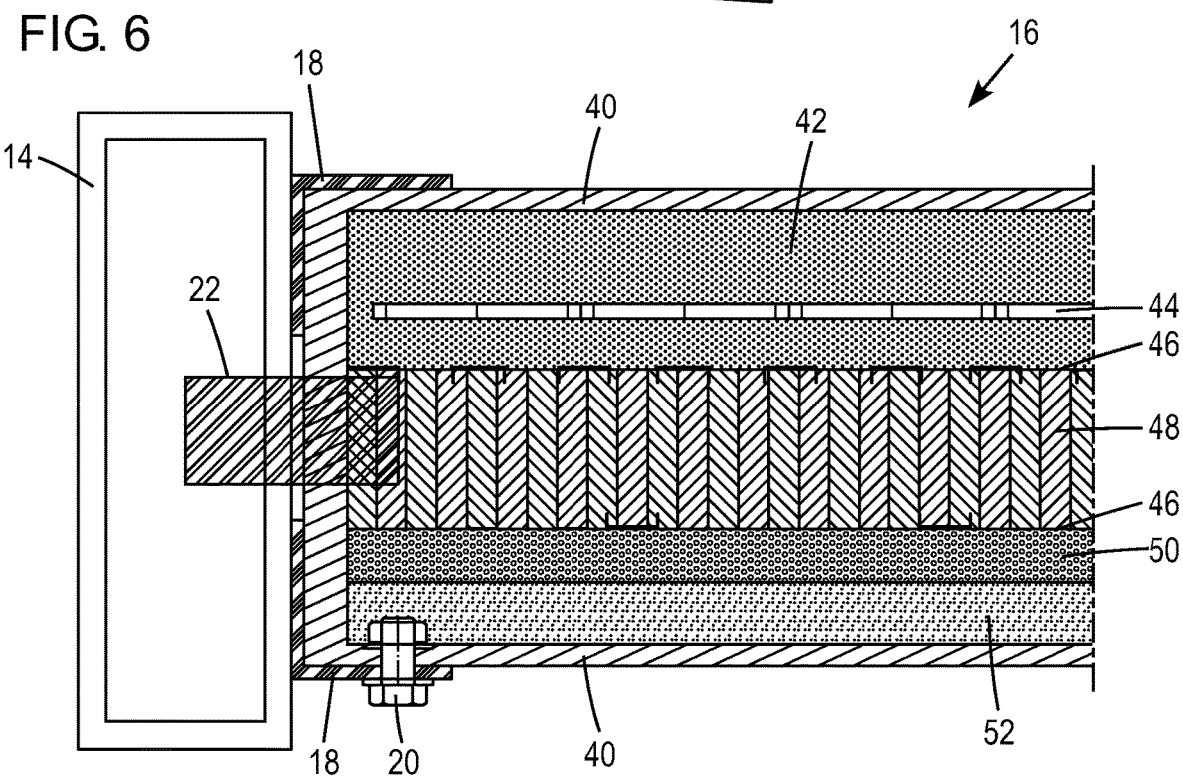
FIG. 6 is a partial cross-section of an alternative embodiment of the louver barrier invention showing various components of the invention and connected to a support post as shown in FIGS. 1 and 2.
Figure 7:
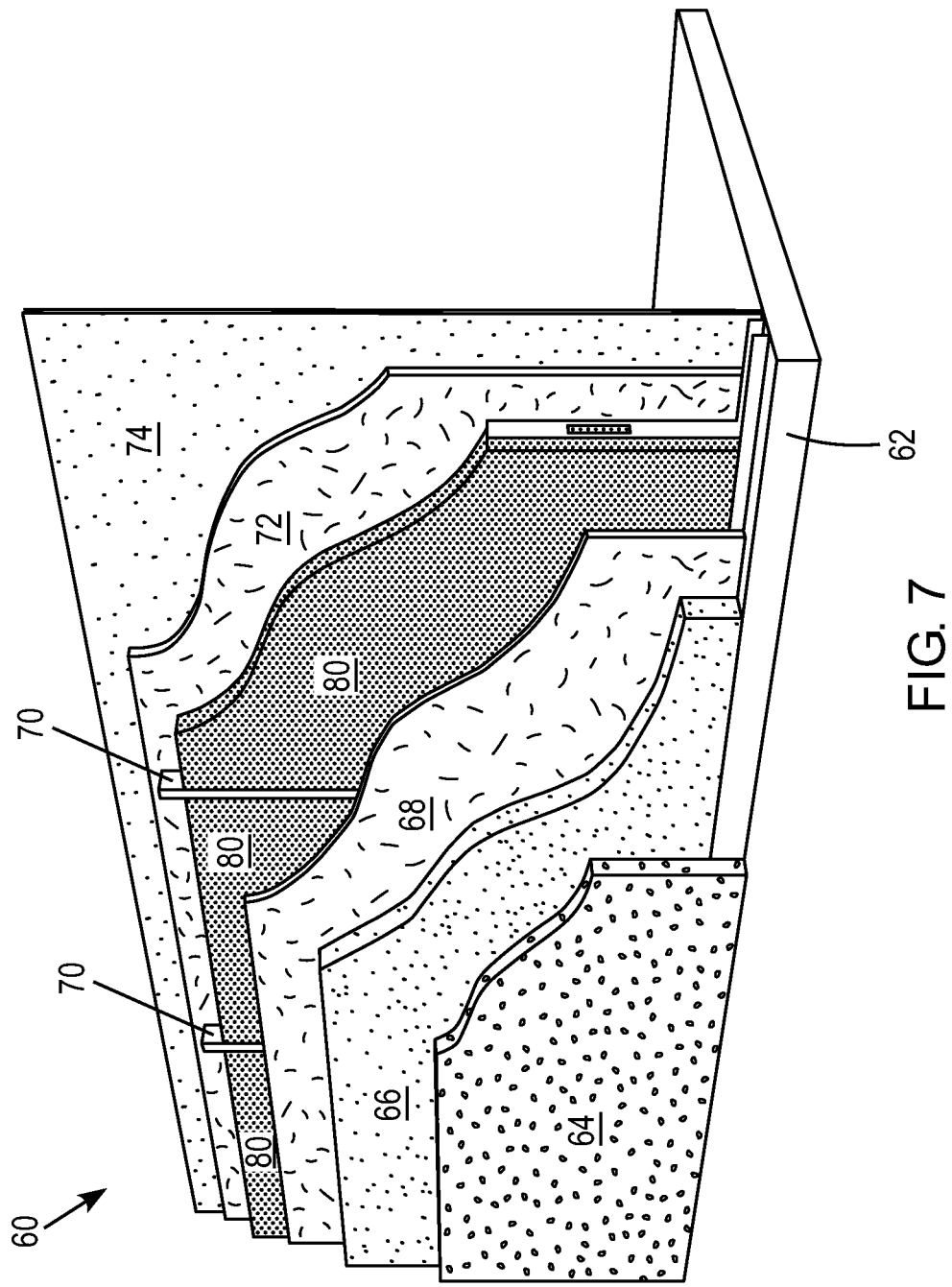
FIG. 7 shows a presently preferred embodiment of the unified wall panel system of the present invention.

FIGS. 1-7 illustrate various embodiments of the present invention. FIGS. 1 and 2 illustrate a security apparatus which may be used to protect, among other things, an electric power grid or similar structure. FIGS. 3-6 show a louver barrier which may be used in the security structure of FIGS. 1 and 2. The panel structures shown in FIGS. 3-6 may also be used as a door or panels in other structures to prevent against threats, including ballistic, blast, forced entry, high wind and seismic as discussed above. FIG. 5 shows a door or panel with one presently preferred composite structure. FIG. 7 discloses use of the panel structure in a building wall, that is a unified wall panel system.

Referring to FIG. 1, there is a perimeter security structure 10 for an electric power grid or similar structure. The security structure 10 may function as a fence around the electric power grid or other structure to be protected. The security structure may include multiple structures 10 joined together. The security structure 10 includes a concrete base 12, vertical support posts 14 having panel attachments and multiple panels 16 which functions as a louver barrier. The concrete base 12 is above ground or substantially above ground to avoid interfering with underground networks. The vertical posts 14 may comprise a 12"×4"×½" rectangular tube. The panels 16 are in a sloped configuration. The panels are installed on the vertical post system at angles that prevent line of sight through the barrier from the ballistic threat while still allowing airflow through the barrier. These panels 16 may be fabricated to meet different levels of ballistic threats, such as shown for example in FIGS. 3-6 and discussed below. The vertical posts 14 may be augmented with ballistic resistant infill if needed. The vertical posts 14 are set in concrete blocks 12 either poured on site with the use of forms or transported to the site. The concrete blocks 12 may be augmented with a material to provide spall resistance in the event of a nearby blast, if that is a threat. The panel to post attachment mechanism may be angle irons 18, preferably 3"×3", with bolts/nuts 20 (four per louver) as shown in FIGS. 4 and 6 or a similar attachment and welded to posts 14. A pin 22 may be used for aligning the frame of panel 16 to post 14. In one embodiment, the security apparatus 10 may be about 23 feet in height and about 3 feet in width. The entire louver barrier component system shown in FIG. 1 is designed for ease of installation.

The security apparatus 10 provides for a modular product. The panels 16 and vertical posts 14 may be shipped with relative ease anywhere in the U.S.A. and overseas. Local installation contractors can provide the concrete for the base foundations and erect the vertical posts 14 and install the panel barriers 16.

Referring to FIGS. 3-5, the present invention is directed to a new and improved door and/or panel 16. This door and/or panel 16 is a light weight composite which protects against man made hazards such as ballistics, blasts, and forced entry and natural hazards such as high wind, fire and seismic events. There is no known light weight composite on the market providing the protection of the door and/or panel or the invention. The panel weight may be in the range of about 5 lbs. per square foot. Referring to FIG. 5, the door and/or panel 16 may comprise a standard door 30 having dimensions, for example, of 3 feet by 7 feet made of 14 gauge metal such as a standard hollow metal door, although other door sizes may be used without departing from the scope of the invention. The panel of FIG. 5 may weigh about 65 to 90 lbs. The metal door and/or panel 30 will have at least one opening 32, preferably at an end of the panel, for insertion of a composite material providing the protection. In one preferred embodiment, the light weight composite material is premade outside of the door and inserted into the door and the door is thereafter sealed by a cover or other closure 33. The light weight composite may also be formed within inside the panel without departing from the scope of the invention. In a preferred embodiment, the light weight composite comprises a first layer 34 of an aluminum foam core such as Alufoam in the range of about ¼ inch thick to about ¾ inch thick; a second layer 36 of a resin impregnated ballistic material of about ¼ inch to about ½ inch thick; and a third layer 38 of an aluminum foam core such as Alufoam of about ¼ inch thick to about ¾ inch thick. A preferred resin impregnated ballistic material may be H Glass manufactured by Owens Corning or Basalt made by Mafic. A preferred resin is a phenolic epoxy resin such as Hexion Epoxy used with the basalt and a vinyl ester resin such as Ashland Derakane used with the H-glass. The door and/or panel is affordable and may be mass produced. The door and/or panel is easy to install and little or no specialized equipment is required.

While a presently preferred composite is shown in FIGS. 4 and 5, other materials may be used in the door 30, including (1) aluminum foam panel by itself, (2) a resin impregnated ballistic material panel such as basalt or H-glass by itself, (3) a composite of an aluminum foam core such as Alufoam with a resin impregnated ballistic material such as basalt or H-glass on one or both sides, or (4) a composite of resin impregnated ballistic material core such as basalt or H-glass with aluminum foam such as Alufoam on one or both sides.

Referring to FIG. 6, there is shown another embodiment of panel 16 having a door or panel 40 having dimensions of 3 feet by 7 feet of 14 gauge metal such as a standard hollow metal door. The material inside the panel facing the "threat" side may include a cementitious material 42 of approximately ¼ to ¾ inches thick, an expanded metal mesh 44 of standard dimension approximately 9 to 18 gauge thick, a cold rolled C channel 46 approximately ¼ to ¾ inches thick including a solid core 48 of aluminum foam such as Alufoam or basalt therein, a ballistic material 50 such as aluminum foam such as Alufoam or basalt approximately ⅛ to ¾ inches thick and a face material 52 such as aluminum foam such as Alufoam or basalt approximately ⅛ to ¾ inches thick. This panel may weigh about 8 lbs. per square foot.

Referring to FIG. 7, there is shown a wall 60 for a building providing security to the building from threats, including ballistic, blast, forced entry, high wind and seismic. The wall 60 uses unified wall system panels 80 preferably having a composite such as shown in FIG. 5 and the length and width dimensions commensurate with the wall structure. The wall structure 60 is fabricated on a floor slab 62 and includes an exterior wall cladding 64, an exterior wall insulation 66, an exterior structural panel 68, unified wall system panels 80 separated by studs 70, an interior structural panel 72 and interior drywall 74. It is understood that not all of the referenced structures are necessary for the wall 60.

The doors or panels of the invention including the composite materials may be made by known manufacturing processes such as extrusion, infusion or pultrusion. The extrusion process is generally used to create objects of a fixed cross-sectional profile. A material is pushed through a die of the desired cross-section. This process is preferably used for the Owens Corning H-glass and Ashland Derakane resin panel, and possibly for the Mafic basalt material and phenolic epoxy system. The infusion process is an alternative method for the Mafic basalt material and phenolic epoxy system. The process uses an infusion table. The dry fabric is laid onto a mold and encased in a protective bag. A vacuum draws on one side while the resin is infused into the other side of the bag. The formed laminate panel is then allowed to cure. The bag is removed, the panel is trimmed and inspected. This is a repeatable, clean process that produces high strength panels. The pultrusion process is a continuous process for manufacturing spendere materials with constant cross-section. The term is a portmanteau word, combining "pull" and "extrusion". As opposed to extrusion, which pushes the material, pultrusion pulls the material. In the standard pultrusion process the reinforcement materials like fibers or woven or braided strands are impregnated with resin, possibly followed by a separate preforming system, and pulled through a heated stationary die where the resin undergoes polymerization. The impregnation is either done by pulling the reinforcement through a bath or by injecting the resin into an injection chamber which typically is connected to the die. Many resin types may be used in pultrusion including polyester, polyurethane, vinylester and epoxy. Resin provides the resistance to the environment, (i.e., the corrosion resistance, the UV resistance, the impact resistance, etc.) and the glass provides strength, in addition to safety from fire. This may be used for both the H-glass and basalt panels. The Alufoam panels are affixed to the H-Glass product or Mafic product either (a) after extrusion or (b) during infusion.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claims.

It is claimed:

1. A multi-threat modular security apparatus for infrastructure protection comprising a substantially above-ground concrete base,
a vertical post system adapted to be attached to said above-ground concrete base and adapted to receive a plurality of louvers, and
said plurality of louvers attached to said vertical post system, said louvers comprising a metal panel with a ballistic protection material therein, wherein the ballistic protection material is a material selected from the group consisting of (a) an aluminum foam panel, (b) a resin impregnated ballistic material, (c) a composite of an aluminum foam core with a resin impregnated ballistic material on one or opposing sides thereof, (d) a composite of a resin impregnated ballistic material core with an aluminum foam panel on one or opposing sides thereof, and (e) one or more of (i) cementitious material, (ii) expanded metal, (iii) cold rolled channel, (iv) solid core, and (v) face material,
wherein said plurality of louvers are constructed and arranged on said vertical post system to provide ballistic protection to the infrastructure and air flow through the louvers to the infrastructure and eliminate the line of sight to the infrastructure.

2. The multi-threat modular security apparatus of claim 1 wherein the ballistic protection material comprises a composite of a first aluminum foam panel, a resin impregnated ballistic material core and a second aluminum foam panel.

3. The multi-threat modular security apparatus of claim 2 wherein the first and second aluminum foam panels are about ¼" to ¾" thick and the resin impregnated ballistic material is about ¼" to ½" thick.

4. The multi-threat modular security apparatus of claim 3 wherein the resin impregnated ballistic material is selected from the group consisting of H-glass with a vinyl ester resin and basalt with a phenolic epoxy resin.

* * * * *

UNITED STATES PATENT AND TRADEMARK OFFICE
CERTIFICATE OF CORRECTION

Page 1 of 1

PATENT NO. : 11,702,856 B2
APPLICATION NO. : 16/999562
DATED : July 18, 2023
INVENTOR(S) : Kenneth M. White and Allan R. Mangold It is certified that error appears in the above-identified patent and that said Letters Patent is hereby corrected as shown below:

On the Title Page

(71) Applicant: ATFP Associates LLC, Ponte Vedra Beach, FL (US) is incorrect and should read as follows:
-- (71) Applicant: ThreatStop LLC, Sheridan, WY (US) --.

Signed and Sealed this
Twenty-second Day of August, 2023

Katherine Kelly Vidal
*Director of the United States Patent and Trademark Office*